Dec. 14, 1926.
T. S. COLE
1,610,261
STORAGE BATTERY CONSTRUCTION
Filed Sept. 5, 1923
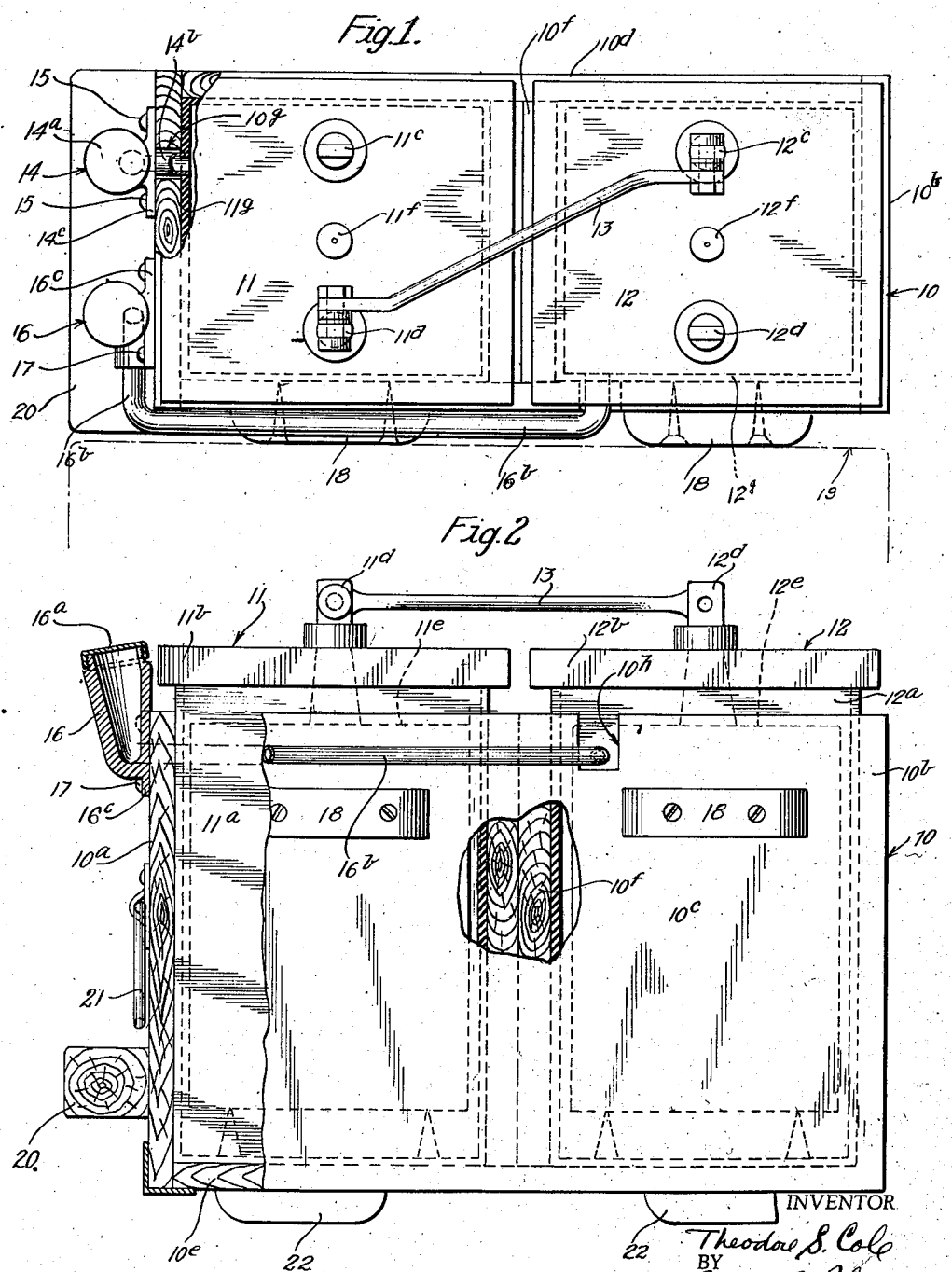
INVENTOR
Theodore S. Cole
BY
Robert S. Blair
ATTORNEY Patented Dec. 14, 1926.

1,610,261

UNITED STATES PATENT OFFICE.

THEODORE S. COLE, OF NEW HAVEN, CONNECTICUT, ASSIGNOR TO THE SAFETY CAR HEATING & LIGHTING COMPANY, A CORPORATION OF NEW JERSEY.

STORAGE-BATTERY CONSTRUCTION.

Application filed September 5, 1923. Serial No. 661,025.

This invention relates to construction for batteries, and more particularly for storage batteries.

One of the objects of this invention is to provide a simple and practical construction for battery containers of convenient arrangement and ready accessibility to the interior of the container or cell. Another object is to provide a tray construction for receiving a battery container or cell in which a ready assembly as well as convenient accessibility to the various parts is assured, and more particularly to provide a construction for a tray for assembling a plurality of cells to form a battery in which convenience of handling, inspection, filling and of other operations of like nature may be gained in a thoroughly practical manner. Another object is to provide a construction of the above nature that will be well adapted to meet the conditions of hard practical use. Other objects will be in part obvious or in part pointed out hereinafter.

The invention accordingly consists in the features of construction, combinations of elements and arrangements of parts as will be exemplified in the construction to be hereinafter set forth and the scope of the application of which will be indicated in the following claims.

In the drawing, in which is shown one of various possible embodiments of this invention, Figure 1 is a plan view of a tray containing several cells, herein illustratively shown as two in number; and Figure 2 is a side elevation as viewed from the bottom of Fig. 1, certain of the parts being shown in section in order to show the construction more clearly.

Similar reference characters refer to similar parts throughout the several views in the drawing.

Referring now to the drawing, there is shown a battery crate or tray, generally indicated at 10, herein illustratively shown as constructed of wood, comprising a front wall $10^a$, a rear wall $10^b$, and side walls $10^c$ and $10^d$ associated with the bottom member $10^e$, these parts being secured together in any suitable manner. The crate or tray 10 is adapted to receive a plurality of individual cells to form collectively a battery of such cells or a section of a larger battery of such cells. As herein illustratively shown, the tray 10 is adapted to receive two individual cells, generally indicated at 11 and 12, and it will be noted that with respect to the front wall $10^a$ the cells are arranged two deep, that is, the cell 11 is positioned adjacent the front wall $10^a$, whereas the remaining cell 12 of the illustrative battery of two cells is positioned remote from the front wall $10^a$ and, with respect to the front wall $10^a$, is positioned to the rear of the cell 11. Preferably the cells 11 and 12 are spaced from one another within the tray 10 and for this purpose the two cells may be separated as by means of a dividing wall $10^f$ extending transversely of the tray 10 so as to divide the interior of the tray into substantially two pockets, one for each cell. In this manner the cells are kept out of contact with each other and losses of capacity, as by creeping electrolyte, avoided.

The cells received within the tray 10 are preferably of the storage type and may conveniently be of the lead type. The cells 11 and 12 comprise containers $11^a$ and $12^a$, respectively, made of a suitable material that is inert with respect to the action of the electrolyte and may conveniently be made, for example, of lead. The containers $11^a$ and $12^a$ preferably fit snugly within the respective sections of the tray 10 and, moreover, are provided with covers or tops $11^b$ and $12^b$, respectively, which may substantially seal the upper ends of the containers $11^a$ and $12^a$ in any desired and convenient manner.

Through the cover plate $11^b$ of the cell $11^a$ extend the terminals $11^c$ and $11^d$, respectively, to permit connection to be made exteriorly with the positive and negative plates of the cell 11 and, similarly, the cell 12 has extending upwardly through the cover plate $12^b$ the terminal posts $12^c$ and $12^d$, perferably also in sealed connection with the cover plate 12. Where the battery unit comprises two cells, as shown in illustrative embodiment of this invention, a strap 13 connects two of terminal posts, as $11^d$ and $12^c$ in opposite polarity so that the connection to the battery unit for charging or discharging or for connection to other and like battery units may be made through the terminal posts $11^c$ and $12^d$.

The plates within the cells may be of any suitable construction, and in Fig. 2 are merely diagrammatically and collectively indicated at $11^e$ and $12^e$ for the two cells 11 and 12, respectively. Suitable openings or vents for the escape of gas from the cell are preferably provided in the cover plates $11^b$ and $12^b$ as at $11^f$ and $12^f$, respectively. Such gas escape vents may be of any desired and convenient construction.

Referring now to Fig. 1, it will be seen that there is provided a filling cup, generally indicated at 14, positioned and mounted laterally of the container $11^a$ of the cell 11, and preferably in spaced relation from one of the side walls, as the wall $11^g$ of the cell con- container $11^a$. This filling cup 14 is positioned so that its upper open end, which is provided with a detachable closure $14^a$ preferably in the form of a screw-cap, is well above the upper edges or ends of the plates $11^e$ in the container $11^a$ of the cell 11, and at its lower end is connected by a short conduit or tube $14^b$, the other end of which is in connection with the interior of the container $11^a$. The conduit or tube $14^b$ is rigidly connected in any suitable manner to the side wall $11^g$ of the container $11^a$, and where these parts are made of lead, as may conveniently be the case where the cell is of the lead type, the tube $14^b$ may be joined to the side wall $11^g$ and thus form a substantially rigid support for the filling cup 14, which likewise may conveniently be made of lead. The cup 14 is thus supported in spaced relation from the side wall $11^g$ of the container $11^a$, and the front wall $10^a$ of the crate or tray 10 is recessed or slotted adjacent its upper end, as at $10^g$, to accommodate the conduit or tube $14^b$. Thus the cell 11 with its container $11^a$ and filling cup 14 may be readily inserted in or removed from the tray 10, and upon insertion it will be noted that the front wall $10^a$ is interposed between the filling cup $14^a$ and the container $11^a$. The filling cup $14^a$ has formed preferably integrally therewith, the lugs $14^c$ being plane-faced so as to engage the outer surface of the front wall $10^a$, and is provided with suitable apertures through which screws 15 may be passed into the front wall $10^a$ to secure the cup 14 in position. The mounting of the filling cup 14 is thus reinforced and strengthened, and it will be noted that the screws 15 may be readily removed to permit the cell with its filling cup to be lifted out of the tray.

The container $12^a$ of the cell 12 has one of its side walls, that is, $12^g$, connected by a conduit or tube $16^b$ so as to form a communication with the interior of the cell 12, and the tube $16^b$, it will be seen, passes outwardly through a recess $10^h$ in the side wall $10^e$ of the tray 10, whence the tube $16^b$ passes exteriorly of the side wall $10^e$ to the front wall $10^a$. The tube $16^b$ is thereupon bent to pass along the front wall $10^a$ and its end is connected to the lower part of a filling cup 16 held in substantial alignment both vertically and horizontally with respect to the filling cup 14 hereinbefore described. The tube $16^b$ thus supports the filling cup 16 in spaced relation from the cell container $12^a$, and it will be noted that with the construction thus far described the cell 12 with its filling cup 16 may be readily inserted in or removed from the tray 10.

Preferably the filling cup 16 is provided with the plane-faced lugs $16^c$ to permit the filling cup to be secured rigidly in position to the upper end portion of the front wall $10^a$, as by means of the screws 17.

The filling cups 14 and 16 are preferably of substantially identical construction and in Fig. 2 one of these cups, namely, cup 16, is shown in section. It will be noted that it is substantially funnel shaped and is provided with a detachable closure $16^a$ preferably taking the form of a screw cap which may be placed in sealed relation with the cup 16 in any suitable manner.

As will be seen in Fig. 2, the filling cups, thus arranged in substantial alignment upon the front wall $10^a$ of the crate 10, are positioned adjacent the upper end of the front wall and at such a height that the cell containers $11^a$ and $12^a$ may be filled to the desired height with electrolyte. The height of the latter, as is well known, is preferably such that the plates within the cells are well submerged and hence the level of the electrolyte extends preferably well above the upper ends of the plates within the cells. Thus the cells may not only be filled from substantially a single point with respect to the whole battery of cells, but also it will be seen that inspection as to the electrolyte in the individual cells is greatly facilitated and made more convenient. The filling cups thus positioned on the front wall $10^a$ will contain electrolyte to the same depth or level as is the case within the respective cell, and hence a removal of the closures from the filling cups not only gives an instant indication of the level of the electrolyte within the respective cell but also permits the removal of electrolyte therefrom as by means of a syringe for testing purposes. Moreover, it will be seen that the filling of the cells or the removal of electrolyte therefrom for inspection or other purposes made possible by this invention avoids the splashing or spilling of electrolyte not only over the cells themselves but also over the crate and, moreover, the cell container as well as the crate is thus well protected against the detrimental effects resulting from flooding the cell or cells, as by over-filling, since the cups 14 and 16 make certain that the overflow is not allowed to be discharged over the cells and within the crate but, moreover, is discharged exteriorly thereof. The detrimental effects of corrosion of both the cell containers and the crate are thus effectively avoided.

In order to protect the tube or conduit $16^b$ which, as above noted, preferably passes exteriorly of the tray 10 to its associated filling cup 16, there are provided blocks 18 suitably secured to the side wall 10ᶜ and of such dimensions that their outer edges, as viewed in Fig. 1, project preferably slightly beyond the outer edge of the conduit 16ᵇ. Thus, as the tray 10 with its associated cells is handled or, for example, when the battery unit herein described is associated with another or like battery unit placed alongside of it, as indicated diagrammatically at 19, injury to the conduit 16ᵇ is prevented. At this point it may be noted that where a plurality of battery units, as illustratively shown in Fig. 1, are assembled or aligned with respect to one another, the filling cups or openings for all cells are thus positioned in a substantially concentrated portion of the whole battery, that is, at the forward end, and access to the electrolyte for the various purposes above described is thus made more convenient. This is particularly advantageous where the battery units are encased as for traction or train-lighting purposes, for example, in which case it will be seen that the burdensome handling of the battery crate or crates as a whole to gain access to the electrolyte is effectively avoided.

Upon the front wall 10ᵃ is mounted in any suitable manner a block 20 extending preferably across the entire extent of the front wall and projecting preferably beyond the outer edges of the filling cups associated with the front wall. The filling cups are thus well protected against injury.

The tray 10 may be provided with handles, one of which is indicated at 21 mounted upon the front wall 10ᵃ, and associated with the bottom member 10ᵉ of the tray 10 are suitable blocks 22 adapted to support the tray 10 in spaced relation with respect to the supporting surface upon which the tray 10 rests.

It will thus be seen that there has been provided in this invention a battery construction in which the several objects and many advantages are successfully achieved. It will be seen that the construction provided is highly advantageous, not only in permitting exceedingly convenient access to the interior of the cells as for filling thereof with electrolyte or for inspection, but also in effectively avoiding the undesirable and detrimental spilling and splashing of electrolyte upon the cell structures themselves, as well as upon the crate or tray.

As many possible embodiments may be made of this invention and as many changes might be made in the embodiment above set forth, it is to be understood that all matter hereinbefore set forth or shown in the accompanying drawings is to be interpreted as illustrative and not in a limiting sense.

I claim as my invention:

1. In a construction of the class described, in combination, a container adapted to receive the elements of a storage cell including an electrolyte, a tray for receiving said container and adapted to substantially encase the sides thereof, an opening into said container in a side wall thereof and below the level of the electrolyte therein, and a filling cup mounted upon the outer surface of a side wall of said tray and communicating with said opening, said filling cup being mounted in upright position with its upper rim above the level of the electrolyte in said cell and with its base below said level.

2. In a construction of the class described, in combination, a container adapted to receive the elements of a storage cell including an electrolyte, a tray for receiving said container and adapted to substantially encase the sides thereof, an opening into said container in a side wall thereof and below the level of the electrolyte therein, a filling cup mounted upon the outer surface of a side wall of said tray, the bottom of the inside of said cup being below the level of the electrolyte in said container and the upper rim of said cup being above said level, and a pipe passing through a wall of said tray and connecting a lower portion of said cup with said opening in said container, said pipe extending throughout below the level of the electrolyte in said container.

3. In a construction of the class described, in combination, a tray containing a plurality of battery cells arranged at least two deep with respect to the front wall of said tray, a filling cup supported adjacent the upper end of said front wall of said tray, and means forming a communication between said filling cup and one of said cells remote from said front wall and extending exterior of the cells in front of said remote cell, said filling cup having its bottom below the level of the electrolyte in said cell and its upper rim above said level, and said communicating means extending throughout below said level.

4. In a construction of the class described, in combination, a tray containing a plurality of battery cells arranged at least two deep with respect to the front wall of said tray, a filling cup mounted exteriorly of said front wall, a conduit connected with said filling cup, passing therefrom rearwardly along the exterior of a side wall of said tray, thence through said tray and communicating with the interior of one of said cells remote from said front wall of said tray, said conduit extending throughout below the level of the electrolyte in said cell and the upper rim of said filling cup being above said level.

5. In construction of the class described, in combination, a tray containing a plurality of battery cells arranged at least two deep with respect to the front wall of said tray, a filling cup positioned adjacent the upper end of the front wall of said tray and in communication with the cell adjacent said front wall, a second filling cup positioned adjacent the upper end of said front wall and in substantial alignment with said first filling cup, and means forming a communication between said second filling cup and a cell remote from said front wall, and extending exterior of the other cells.

6. In construction of the class described, in combination, a tray containing a plurality of battery cells arranged at least two deep with respect to the front wall of said tray, a filling cup mounted in spaced relation from the cell adjacent said front wall and in communication with said cell so that upon insertion of said cell in said tray said filling cup is positioned substantially exteriorly of said front wall, a second filling cup positioned adjacent the upper end of said front wall and adjacent said first filling cup, and means forming a communication between said second filling cup and a cell remote from said front wall comprising a conduit passing through a side wall of said tray and exteriorly thereof to said second filling cup, said side wall being broken away to permit the passage of said conduit therethrough.

7. In construction of the class described, in combination, a tray containing a plurality of battery cells arranged at least two deep with respect to the front wall of said tray, a filling cup mounted in spaced relation from the cell adjacent said front wall and in communication with said cell so that upon insertion of said cell in said tray said filling cup is positioned substantially exteriorly of said front wall, a second filling cup positoned adjacent the upper end of said front wall and adjacent said first filling cup, and means forming a communication between said second filling cup and a cell remote from said front wall comprising a conduit passing through a side wall of said tray and exteriorly thereof to said second filling cup, said side wall being recessed at its upper end to permit passage of said conduit upon insertion and removal of said cell from said tray.

8. In construction of the class described, in combination, a tray containing a plurality of battery cells arranged at least two deep with respect to the front wall of said tray, a filling cup supported exteriorly of said front wall and adjacent the upper end thereof, one of the side walls of said tray being recessed adjacent one of the cells remote from said front wall, a conduit connected at one end with said filling cup and passing exteriorly of said side wall and through the recess therein to said cell remote from said front wall, and protective means mounted upon said side wall and projecting beyond the vertical plane passing through the outer edge of said conduit positioned exteriorly of said side wall.

9. In a construction of the class described, in combination, a tray containing a plurality of battery cells arranged at least two deep with respect to the front wall of said tray, a filling cup mouned exteriorly of said front wall, a conduit connected with said filling cup, passing therefrom rearwardly along the exterior of a side wall of said tray, thence through said tray and communicating with the interior of one of said cells remote from said front wall of said tray, said conduit extending throughout below the level of the electrolyte in said cell and the upper rim of said filling cup being above said level, and protective means mounted upon said side wall of said tray and projecting outwardly therefrom beyond the vertical plane passing through the outer edge of the portion of said conduit positioned along said wall.

In testimony whereof, I have signed my name to this specification this 23d day of August, 1923.

THEODORE S. COLE.